Sept. 25, 1951 W. R. PETERSON ET AL 2,569,190
BALE HANDLING VEHICLE
Filed Dec. 27, 1946 3 Sheets-Sheet 2
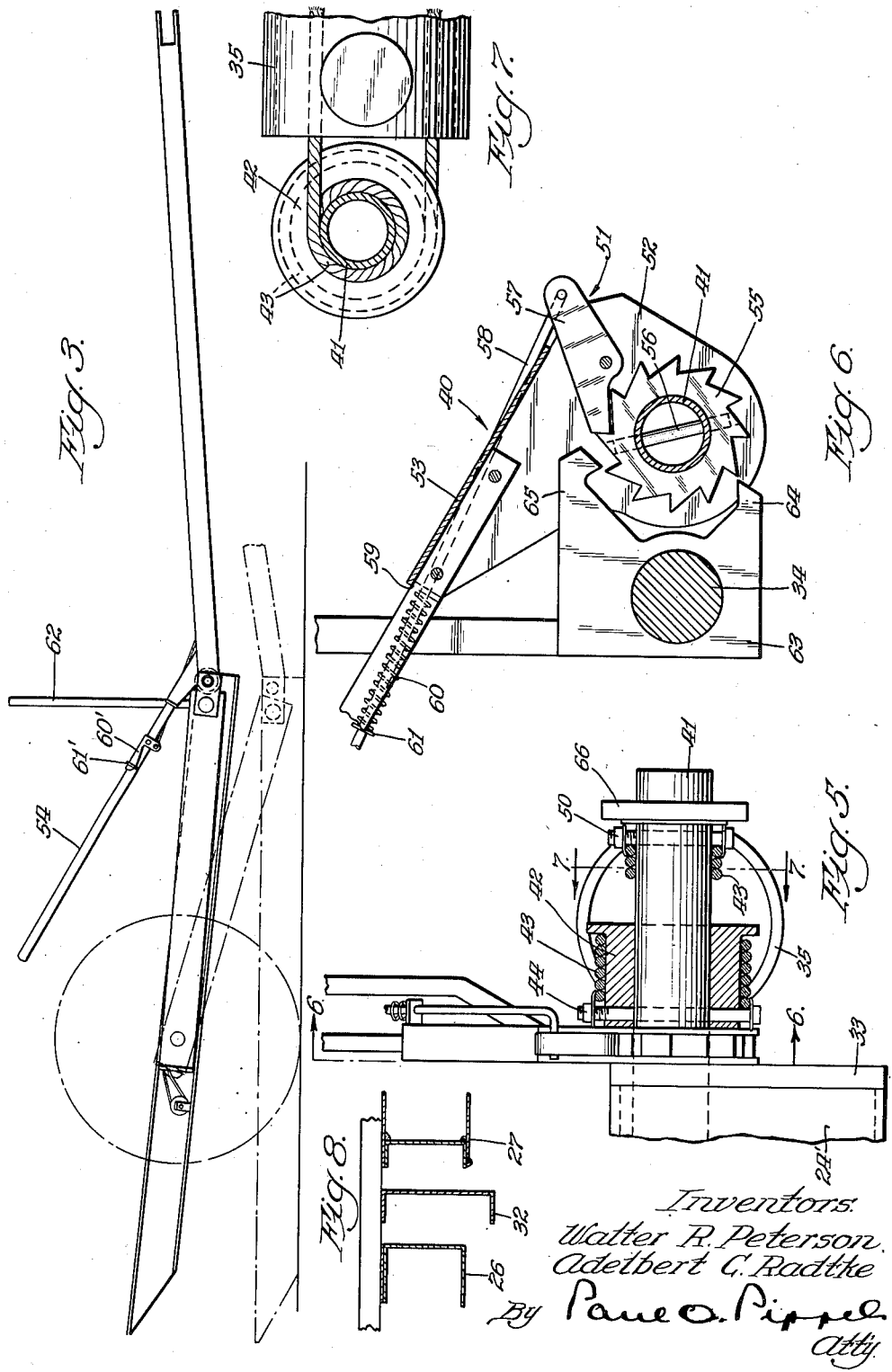

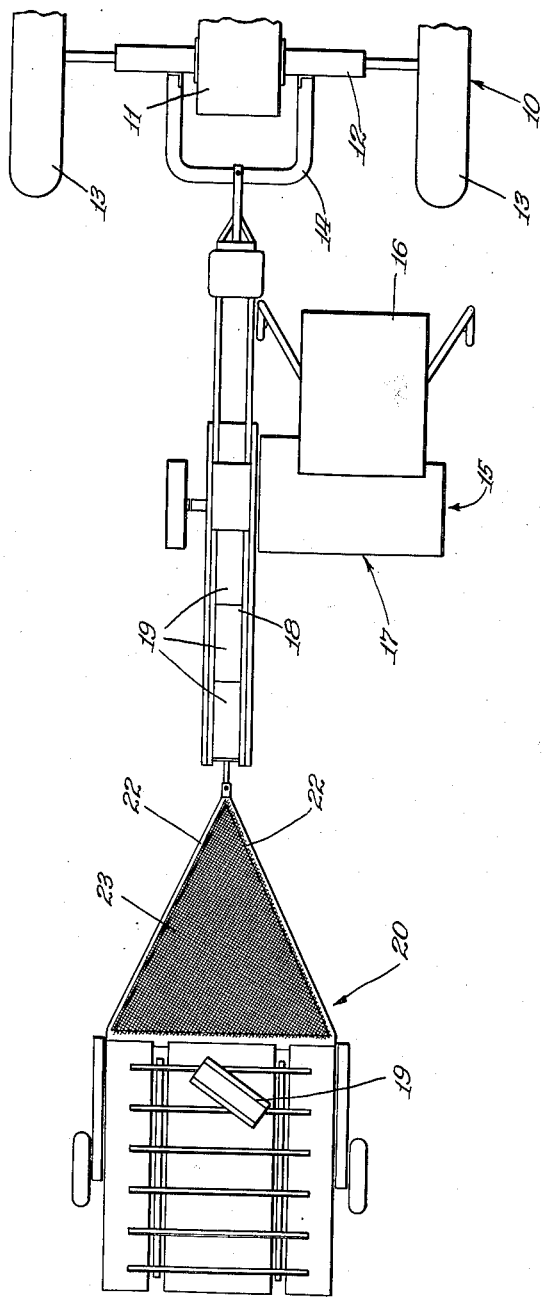

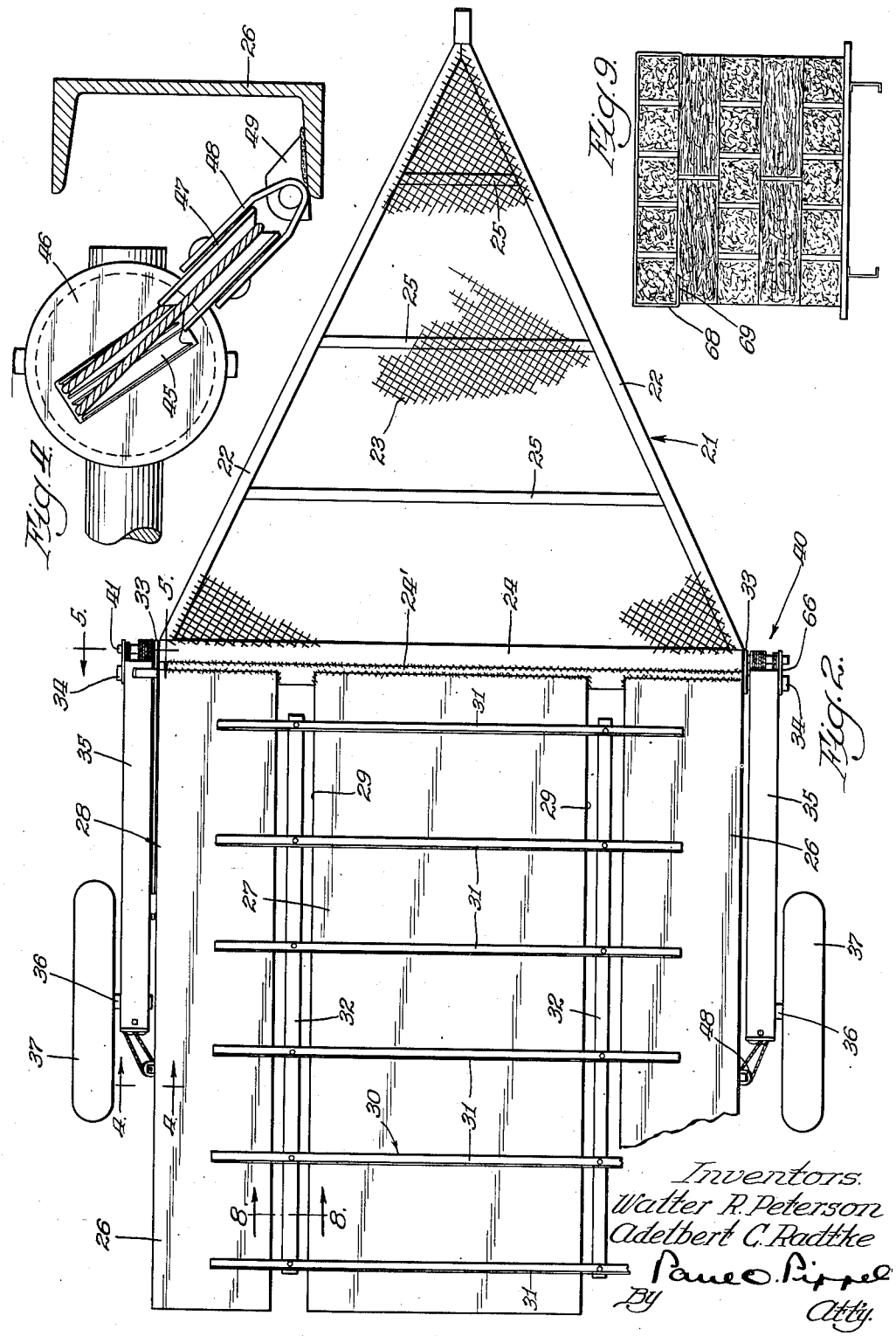

Patented Sept. 25, 1951

2,569,190

UNITED STATES PATENT OFFICE 2,569,190

BALE HANDLING VEHICLE

Walter R. Peterson, Hinsdale, and Adelbert C. Radtke, Oak Park, Ill., assignors to International Harvester Company, a corporation of New Jersey Application December 27, 1946, Serial No. 718,812

7 Claims. (Cl. 214—44)

This invention concerns a trailing vehicle. More specifically it relates to a vehicle adapted to be connected to a mobile baling unit for receiving and transporting bales of baled material.

It is the prime object of this invention to provide a vehicle construction adapted to cooperate with a baling unit whereby the discharged bales of said unit may be transported and subsequently placed upon the ground in stacks for storage purposes.

Another object is to provide a vehicle adapted to be connected to a baling unit for receiving, transporting and handling baled material.

It is still another object to provide an inexpensive trailing vehicle adapted to receive baled material from the baling chamber of a mobile baler, said vehicle including a pallet construction which is supported thereon and is adapted to be located on the ground for storing baled material.

It is still another object to provide a trailing vehicle which is adapted for connection to a mobile baling device, said trailing vehicle including a platform upon which a pallet is supported, said platform having adjusting means whereby the same may be lowered to the ground for locating said pallet and bales of baled material on the ground.

It is still another object to provide an inexpensive farm trailer that can readily be utilized for a number of farm chores, one of said chores being the transporting of baled material which may be stored in the field upon movable pallets.

Other objects will become more apparent from a reading of the specification when examined in conjunction with the accompanying drawings, in which:

Figure 1 is a diagrammatic plan view showing a trailing unit attached to the rear of a tractor-drawn baling unit.

Figure 2 is a plan view of the trailing vehicle with which the present invention is concerned.

Figure 3 is a side elevational view of said vehicle showing the same in a lowered position with respect to the ground.

Figure 4 is a detail sectional view taken along the line 4—4 of Figure 2.

Figure 5 is a sectional view taken along the line 5—5 of Figure 2.

Figure 6 is a sectional view taken along the line 6—6 of Figure 5.

Figure 7 is a sectional view taken along the line 7—7 of Figure 5.

Figure 8 is a sectional view of a portion of the structural parts of a trailing unit showing its relation to a pallet construction, said view being taken along the line 8—8 of Figure 2.

Figure 9 is a diagrammatic view of a pallet construction having a number of bales located thereon for storage purposes.

Referring particularly to Figure 1, the rear portion of a mobile power means such as a tractor is generally indicated by the reference character 10. The tractor 10 consists of a body structure 11 mounted on axle housings 12 carried on ground wheels 13. A draw-bar structure 14 is connected to the axle housings 12 and projects rearwardly thereof. A baling unit 15 is connected to the draw-bar structure 14 and consists essentially of a hay pick-up means 16. The hay pick-up means 16 supplies material to an auger feed, not shown, encased in the structure 17. The material is carried from the structure 17 to a baling chamber 18 whereupon it is formed into baled units indicated by the reference character 19.

Referring now particularly to Figures 1, 2, and 3, a trailing vehicle is generally designated by the reference character 20. The trailing vehicle 20 is connected at its forward end to the baling unit 15 by means of a triangular sloping combined receiving and hitch frame 21. The hitch frame 21 consists of diverging side members 22 and an upper screen member 23. The side members 22 are rigidly connected at their rearward portions by means of a transversely extending tubular member 24. The tubular member 24 may be formed, as shown in the present construction, by two channel members 24' being welded along their channel ends to form a rigid tubular structure. Transverse supporting members 25 further serve to rigidly secure the members 22 in the triangular form.

Connected at their forward ends to the transverse tubular member 24 are a pair of laterally spaced, longitudinally extending end members 26. A center member 27 is also rigidly connected to the transverse member 24 and extends rearwardly between said end members 26. As best shown in Figure 8, the end members 26 and the center member 27 may be suitably formed of sheet metal material welded together to form a rigid box section thereby functioning as a supporting platform generally designated by the reference character 28. The center member 27 is laterally spaced with respect to the inward ends of each end member 26 to form a pair of longitudinally extending open end slots 29 in the platform 28.

As best shown in Figures 1, 2, and 8, a removable pallet 30 is supported on the supporting platform 28. The pallet 30 consists of transversely extending spaced members 31 and longitudinally extending ground-engaging members 32. As best shown in Figure 8, the longitudinally extending ground-engaging members 32 lie within the slots 29 and extend downwardly in said slots below the members 26 and 27 which comprise the platform 28.

The transverse ends of the tubular member 24 are closed by means of a bearing plate 33 which is rigidly secured thereto. A pair of laterally spaced stub shafts 34 are connected to the tubular member 24 and project outwardly through the bearing plates 33. Each of the stub shafts 34 pivotally carries a rearwardly extending tubular arm 35. Each tubular arm 35 has a shaft 36 connected at its rearmost end on which is journaled a ground wheel 37.

The platform 28 may be vertically adjusted with respect to the ground by means of a winch arrangement generally designated by the reference character 40. The winch arrangement 40 is of the Chinese windlass type and consists primarily of a tubular shaft 41 which extends transversely through the tubular member 24 and is journaled on the members 33. An enlarged winch member or pulley 42 is rigidly secured to each end of the shaft 41. Each pulley 42 has an end portion of a flexible element 43 securely wound around the same. A clamping arrangement 44 clamps one end of the flexible element 43 to the pulley 42, said securing element 44 also serving to connect the winch element 42 rigidly to the shaft 41. Each flexible element 43 extends through each tubular arm 35 and as best shown in Figure 4, over one of a pair of sheaves 45 which is pivotally journaled on an annular closure member 46 fastened to the end of each tubular arm 35. The flexible element 43 is routed from the sheave 45 over a sheave 47, which is pivotally connected by means of a bracket 48 to each longitudinally extending end member 26 by means of a pin and bracket arrangement 49. The flexible element 43 is routed from the sheave 47 back through the tubular arms 35, and the free end of said flexible element is rigidly connected and wound around the shaft 41, as best shown in Figures 2, 5, and 7. A securing means 50 rigidly secures said flexible element to the shaft 41.

It can readily be seen that upon rotation of the shaft 41 a Chinese windlass-type of winch is provided for vertically adjusting the platform 28 with respect to the ground. The shaft 41 is rotated by means of a pawl and ratchet mechanism generally indicated by the reference character 51 as best shown in Figure 6. The pawl and ratchet mechanism 51 consists of a pair of spaced vertical plate members 52 which are rigidly secured together by means of a transverse wall 53. The plate members 52 are journaled for pivotal movement on the end of the transverse shaft 41. A manual lever 54 is rigidly connected to the plate members 52 as best shown in Figure 6. A ratchet wheel 55 is rigidly secured to the shaft 41 by means of a pin 56, said ratchet being positioned between the plate members 52. A pawl 57 is pivotally mounted on the plate members 52 and is adapted to engage the teeth of the ratchet 55. The pawl 57 is connected to a link 58 which extends through a stop member 59 formed by a bent end of the transverse wall 53. The link 58 is further provided with a spring 60, which is in abutment with the stop 59, and a pin 61 extending through the link 58. The end of the link 58 is connected to a hand lever 60' which is pivotally mounted on the manual lever 54 and is adapted to be locked against said manual lever by means of a section of wire serving as a clamping element 61'.

A release lever 62, as best shown in Figures 3, 5, and 6, is connected to a release element 63 which is journaled on one of the stub shafts 34. The release element 63 includes vertically spaced teeth 64 and 65 which are adapted to alternately engage teeth of the ratchet 55 upon rocking movement of said release element 63 about stub shaft 34. Laterally spaced strap members 66 are positioned over the stub shafts 34 and the ends of the transversely extending member 41.

During the operation of the baler, bales 19 are ejected from the baling chute as the baler is moving over the ground. The bales 19 are received on the receiving platform 21. An operator stationed on the supporting platform 28 handles the bales and places them in a piled orderly fashion on the pallet 30. When the pallet 30 has a predetermined number of bales located thereon, the tractor and the baling unit are brought to a rest. The pawl 57 is at this point locked out of engagement with the ratchet 55 by means of the clamping wire 61'. The operator thereupon actuates the manual release lever 62 in a rocking motion about the stub shaft 34, thereupon permitting the ratchet 55 to move in a clockwise direction. As the ratchet 55 moves in a clockwise direction, the transverse shaft 41 moves in the same direction. The flexible element of the Chinese-type windlass winch thereupon lowers the platfform 28 with respect to the ground. The platform 28 is now in a position where it is either resting on or is substantially close to the ground. Since the pallet 30 is provided with longitudinally extending members 32 which project below the platform 28, the pallet will in this position also be located upon the ground. The operator therefore again initiates forward movement of the tractor and its baler, thereupon moving the platform 28 forwardly from beneath the pallet. After the vehicle 20 is free of the pallet, the operator thereupon rotates the lever 54, causing the pawl 57 to rotate the ratchet 55 and shaft 41 in a counterclockwise direction, thereby winding up the flexible element 43 to cause vertical movement of the platform 28 into the position desired. When it is desired to again lower the platform, the hand lever 60' is locked against the lever 54 by means of the wire 61 so that the pawl 57 may be free of the teeth of the ratchet 55, thereby again permitting lowering of the platform by means of the release lever 62.

As best shown in Figure 9, the baled hay is stored upon the pallet 30. The upper portion of the stack of baled material is covered by a tarpaulin 68 which has its end tucked under the first layer of bales as indicated at 69. The tarpaulin may be made of canvas or any other suitable weather-proof material. The pallet 30, as best shown in Figure 2, is readily collapsible since the transverse members 31 are loosely connected with respect to the longitudinal members 32. Thus pallets of this type can be collapsed and a limited number of them may be carried on the vehicle 20 as it is operated through the field. The operation is repeated until the predetermined quantity of baled material has been stored and disposed of on the pallets as indicated.

The construction shown permits the storing of baled material, such as hay, in an efficient and effective manner, it being therefore unnecessary for the farmer to construct large and expensive hay storage buildings. The farmer is thus able to store his hay in the field until it is sufficiently dried out and cured thereby eliminating the fire hazard which is normally encountered with the storing of large quantities of hay inside barn structures. When the farmer is ready to remove a quantity of hay from the field, he simply attaches the vehicle 20 to the draw-bar of a tractor. He thereupon backs up the tractor and lowers the platform 28 within proximity of the ground by means of the winch mechanism previously described. He then moves the trailing vehicle rearwardly until the platform is directly underneath the pallet and the longitudinal members of said pallet are lying within the slots 29 of the platform 28. After raising the platform 28 and the loaded pallet, he is ready to move the baled units to the place desired.

It thus is readily apparent that a novel vertical construction has been disclosed which permits an efficient and unique method of handling baled material. It is to be understood that changes in the present construction may be made which do not depart from the spirit of the invention as disclosed nor the scope thereof as defined in the appended claims.

What is claimed is:

1. A vehicle adapted to be connected to a baling device for receiving bales from a baling chamber, the vehicle including a supporting platform having laterally spaced longitudinally extending end members and a longitudinally extending center member spaced with respect to said end members to form longitudinally extending open end slots in said platform, said platform being adapted to support a pallet having supporting portions lying within said slots and adapted to project downwardly through the slots below said platform, laterally spaced arms pivotally connected to said platform and means for adjusting said arms with respect to the ground thereby vertically adjusting said platform with respect to the ground whereby supporting portions of a pallet may be located on the ground and said platform may be withdrawn from the pallet.

2. A wheeled vehicle adapted to be connected to the rear of a baling device for receiving bales from a baling chamber, the vehicle comprising a receiving frame, a supporting platform extending rearwardly of said receiving frame, said supporting platform including laterally spaced longitudinally extending end members connected to said receiving frame, and a longitudinally extending center member spaced with respect to said end members to form longitudinally extending open end slots in said platform, said platform being adapted to support a pallet having longitudinally spaced supporting members lying in said slots and having portions adapted to project downwardly through the slots below said platform, arms pivotally connected at their forward ends adjacent the sides of said platform and extending rearwardly with respect to their point of connection, ground wheels journalled on said arms, and means for adjusting the rear ends of said arms with respect to the ground thereby vertically adjusting said platform with respect to the ground whereby the longitudinal members of the pallet may be located on the ground and the platform may be withdrawn from beneath the pallet.

3. A vehicle adapted to be connected to a baling device for receiving bales from a baling chamber, the vehicle including a supporting platform, said supporting platform including laterally spaced longitudinally extending end members and a longitudinal center member, said center member being positioned between and having its sides spaced from said end members to form longitudinally extending open end slots through said platform, the platform being adapted to support a pallet having longitudinally extending laterally spaced members lying in said slots and adapted to project downwardly through the slots below said platform, stub shafts connected to and extending outwardly from the sides of the platform, arms pivotally connected to the stub shafts and extending rearwardly with respect to their point of connection, a ground wheel journalled on each arm, and means for adjusting said arms with respect to the ground thereby adjusting said platform with respect to the ground, whereby the pallet may be located on the ground and the platform may be withdrawn from the pallet.

4. A wheeled vehicle adapted to be connected to a baling device for receiving bales from a baling chamber, the vehicle including a receiving frame, a supporting platform connected to said receiving frame, said supporting platform including laterally spaced longitudinally extending end members and a longitudinal center member, said center member being positioned between and having its sides spaced from said end members to form longitudinally extending open end slots through said platform, the platform being adapted to support a pallet having longitudinally extending laterally spaced members lying in said slots and adapted to project downwardly through the slots below said platform, arms pivotally connected adjacent said platform and extending rearwardly with respect to their point of connection, a ground wheel journalled on each arm, and winch means for adjusting said arms with respect to the ground thereby adjusting said platform with respect to the ground whereby the longitudinal members of the pallet may be located on the ground and the platform may be withdrawn from beneath the pallet.

5. A wheeled vehicle adapted to be connected to a baling device for receiving bales from a baling chamber, the vehicle comprising a receiving frame, a transversely extending member rigidly connected to the rear portion of said receiving frame, a supporting platform associated with said receiving frame, said supporting platform including laterally spaced longitudinally extending end members connected to said transversely extending member, and a longitudinal center member connected at its forward end to said transverse member, said center member being positioned between and having its sides spaced from said end members to form longitudinally extending open end slots through said platform, said platform being adapted to support a pallet having longitudinally extending laterally spaced supporting members lying in said slots and projecting downwardly through the slots below the platform, arms pivotally connected at their forward ends adjacent the sides of said platform and extending rearwardly with respect to their point of connection, a ground wheel journalled on the rear portion of each arm, a power means for adjusting the rear ends of said arms with respect to the ground thereby vertically adjusting the platform with respect to the ground whereby the longitudinal members of the pallet may be located on the ground and the platforms may be withdrawn from beneath the pallet.

6. A wheeled vehicle adapted to be connected to a baling device for receiving bales from a baling chamber, the vehicle comprising a triangular receiving frame, a transversely extending tubular member rigidly connected to the rear portion of said receiving frame, a supporting platform associated with said receiving frame, said supporting platform including longitudinally extending end members having their forward portions connected to said tubular member and a longitudinal supporting member connected at its forward end to said tubular member, said supporting member being positioned between and having its sides spaced from said end members to form longitudinally extending open end slots through said platform, said platform being adapted to support a pallet having longitudinally extending laterally spaced members lying in said slots and adapted to project downwardly through the slots below said platform, tubular arms pivotally connected at their forward ends to said platform and extending rearwardly with respect to their point of connection, a ground wheel journalled on the rear portion of each arm, means for vertically adjusting said platform with respect to the ground including a transverse rotatable shaft journalled within said tubular member, a plurality of sheaves connected to said arms, a sheave on each of said longitudinally extending end members, a flexible element extending through each of said arms and over said sheaves, the free ends of each flexible member being connected to said transverse shaft, a pawl and ratchet mechanism for rotating said shaft to raise said platform, and release means for lowering said platform to a position whereby the longitudinal members of the pallet will rest upon the ground and said vehicle may be withdrawn from beneath the pallet.

7. A wheeled vehicle adapted to be connected to the rear of a baling device for receiving bales from a baling chamber, the vehicle comprising a triangular sloping receiving frame, a transversely extending tubular member rigidly connected to the rear portion of said receiving frame, a supporting platform associated with said receiving frame, said supporting platform including laterally spaced longitudinally extending end members having their forward portions connected to said tubular member and a longitudinal center member connected at its forward end to said tubular member, said center member being positioned between and having its sides spaced from said end members to form longitudinally extending open end slots through said platform, the platform being adapted to support a pallet having longitudinally extending laterally spaced members lying in said slots and adapted to project downwardly through the slots below said platform, tubular arms pivotally connected at their forward ends to said platform and extending rearwardly with respect to their point of connection, a ground wheel journalled on the rear portion of each arm, means for vertically adjusting said platform with respect to the ground including a transverse rotatable shaft journalled within said tubular member, a plurality of sheaves within said hollow arms, a sheave on each of said longitudinally extending end members, a flexible element extending through each of said tubular arms and over said sheaves, the free ends of each flexible member being connected to said transverse shaft, a pawl and ratchet mechanism to rotate said shaft and raise said platform, and release means for lowering said platform to a position whereby the longitudinal members of the pallet will rest upon the ground and said vehicle may be withdrawn from beneath the pallet.

WALTER R. PETERSON.
ADELBERT C. RADTKE.

REFERENCES CITED

The following references are of record in the file of this patent:

UNITED STATES PATENTS

| Number | Name | Date |
|---|---|---|
| 1,485,818 | Schroeder | Mar. 4, 1924 |
| 2,178,647 | Raymond et al. | Nov. 7, 1939 |
| 2,316,435 | James | Apr. 13, 1943 |
| 2,390,306 | Hunziker | Dec. 4, 1945 |